United States Patent [19]

Carlsten

[11] Patent Number: 5,663,971
[45] Date of Patent: Sep. 2, 1997

[54] AXIAL INTERACTION FREE-ELECTRON LASER

[75] Inventor: Bruce E. Carlsten, Los Alamos, N. Mex.

[73] Assignee: The Regents of the University of California, Office of Technology Transfer, Alameda, Calif.

[21] Appl. No.: 626,661

[22] Filed: Apr. 2, 1996

[51] Int. Cl.[6] .................................................. H01S 3/00
[52] U.S. Cl. ............................. 372/2; 372/64; 372/82; 372/37; 372/33; 315/5
[58] Field of Search .......................... 372/2, 64, 33, 372/82, 37; 315/5, 4

[56] References Cited

U.S. PATENT DOCUMENTS

| | | |
|---|---|---|
| 4,298,824 | 11/1981 | Walsh .................... 315/5 |
| 4,809,281 | 2/1989 | Neil et al. ................ 372/2 |
| 4,825,441 | 4/1989 | Marshall et al. ........... 372/2 |
| 4,835,446 | 5/1989 | Nation et al. ............. 315/5 |
| 5,015,914 | 5/1991 | Ives et al. ............... 315/5 |
| 5,280,490 | 1/1994 | Conde et al. ............. 372/37 |

OTHER PUBLICATIONS

Bruce E. Carlsten, "Stable Off–Axis Electron Orbits In A Longitudinal–Wiggler Free–Electron Laser," 78, American Institute of Physics, No. 4, pp. 2811–2816 (Aug. 1995).

Rita G. Lerner, Series Editor, "Advanced Accelerator Concepts," in AIP Conference Proceedings 156 1986 (American Institute of Physics, pp. 394–410). no month available.

H. Takeda et al., "Stable Off–Axis Electron Orbits and Their Radiation Spectrum In A Helical Wiggler," A237 Nuclear Instru. & Methods in Phy. Research, pp. 145–153 (1985) no month avail.

P. Volfbeyn et al., "Measurement of the Temporal and Spatial Phase Variations of a Pulsed Free Electron Laser Amplifier," 22 IEEE Trans. Plasma Sci., p. 659 (1994). no month avail.

*Primary Examiner*—Leon Scott, Jr.
*Attorney, Agent, or Firm*—Ray G. Wilson

[57] ABSTRACT

Electron orbits from a helical axial wiggler in an axial guide field are absolutely unstable as power is extracted from the particles. For off-axis beams an axial FEL mechanism exists when the axial electric field in a TM mode is wiggled to interact with the axial velocity of the electrons that form the beam. The interaction strength is comparable to that for helical FELs and is insensitive to beam orbit errors. The orbits for this mechanism are extremely stable in the absence of space charge and lead to high extraction efficiencies without particle phasing incoherence or interception. This interaction mechanism is suitable for use with intense annular electron beams for high power generation at microwave frequencies.

25 Claims, 5 Drawing Sheets

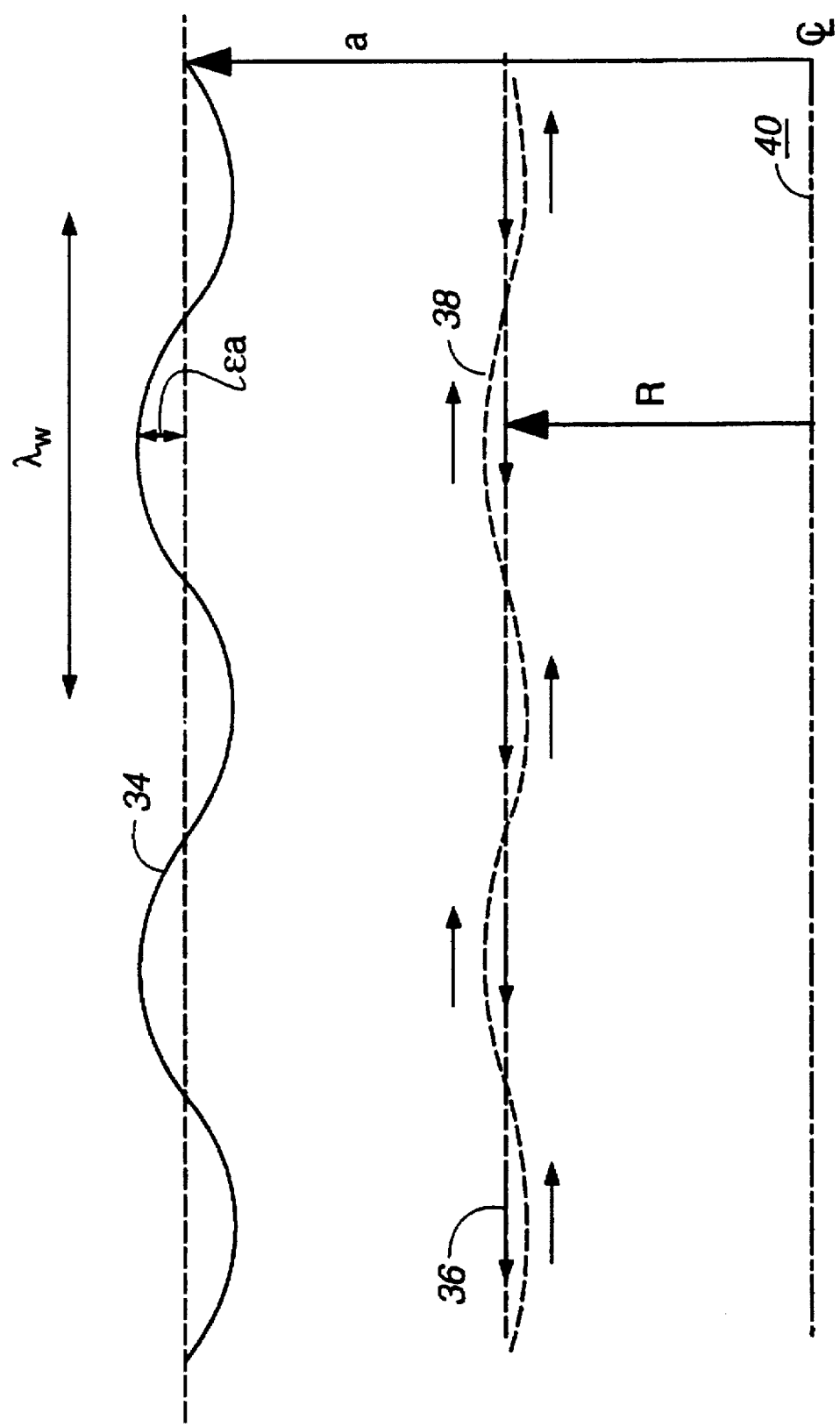

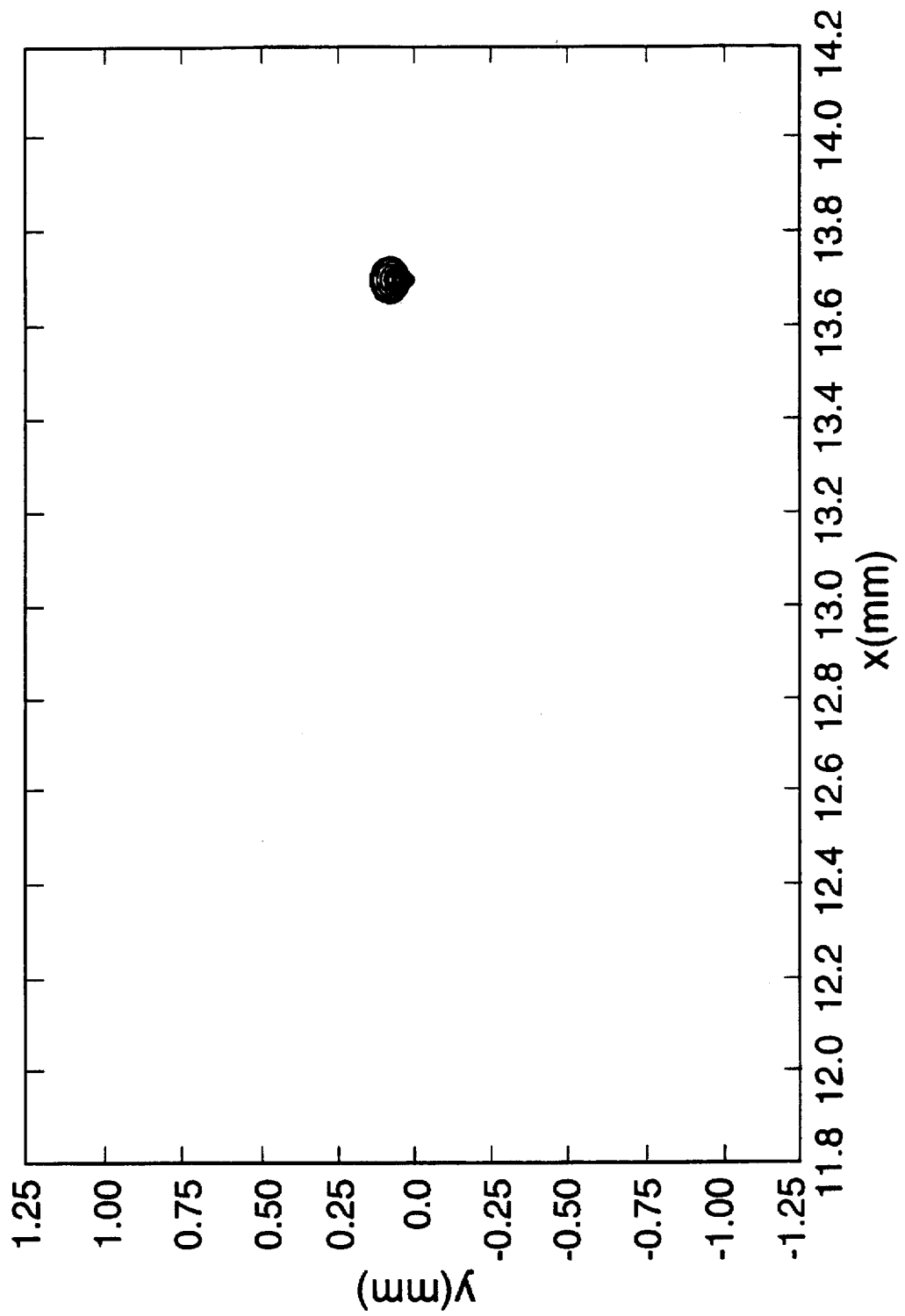

AXIAL INTERACTION FREE-ELECTRON LASER

This invention relates to free electron laser, and, more particularly, to free electron lasers with an off-axis electron beam. This invention was made with government support under Contract No. W-7405-ENG-36 awarded by the U.S. Department of Energy. The government has certain rights in the invention.

BACKGROUND OF THE INVENTION

Electron helical orbits in microwave free electron lasers (FELs) using helical wigglers and an axial guide field become unstable as beam current saturation is reached. Because the instability does not appear before saturation occurs, P. Volbeyn et al., "Measurement of the temporal and spatial phase variations of a pulsed free electron laser amplifier," 22 IEEE Trans. Plasma Sci., pg. 659 (1994), surmise that the instability is driven by the radio frequency electromagnetic fields (rf) and not the beam's own space charge fields. The particle loss resulting from the instability appears to effect the overall extraction efficiency of helical-wiggler FELs.

An annular electron beam was considered by B. E. Carlsten, "Stable off-axis electron orbits in a logitudinal-wiggler free-electron laser," 78 J. Appl. Phys., No. 4, pp. 2811–2816, (1995), for use with kiloampere microwave FELs in order to increase the power output of these devices. An annular electron beam means an electron beam that is annularly disposed about the axis of the direction of travel of the electrons and the electrons travel in a cylindrical pattern in close proximity to the surrounding cavity structure with each electron traversing a helical orbital path along the direction of travel. Orbit stability issues become especially important for this type of electron beam because of the typical small beam-to-wall spacing.

Most microwave FEL experiments have used mildly relativistic (500 keV-1 MeV) pencil axial electron beams interacting with $TE_{11}$ (transverse electric) modes. Since only the electric field can modify the total energy of an electron, it is clear that the power extracted from the electron beam, if any, comes from the coupling of the transverse electron motion with the transverse electric field of the rf for this type of FEL. However, the transverse magnetic field can modify the total transverse force on a particle.

The net transverse force on an electron is given by $$F_x = e(E_x - v_z B_y) = eE_x(1-\beta_z),$$ Eqn. (1)

where $E_x$ is the transverse electric field, $B_y$ is the transverse magnetic field, $v_z$ is the axial electron velocity, and $\beta_z$ is the axial velocity normalized to the speed of light. For relativistic beams the net transverse force scales as $1-\beta_z \approx \gamma^{-2}/2$, where $\gamma$ is the relativistic mass factor, which quickly becomes small as the beam energy is increased. Although the coupling between the motion of an electron and the rf is through the transverse electron motion, the power is efficiently extracted from the axial electron motion. This is one reason why the FEL scales nicely for high power operation with relativistic beams (>10 MeV) at optical wavelengths. Note that the net axial force is given by $$F_z = eE_x \beta_x,$$ Eqn. (2)

which is much smaller than the transverse force induced by either the rf magnetic or electric field.

From symmetry considerations a $TE_{0m}$ rf mode has been proposed to interact with an annular electron beam with helical orbits. However, helical wiggler FELs operating with microwave TE modes have much larger transverse forces than those for optical FELs at high energy and these forces lead to inherently unstable electron orbits that, in turn, result in phase and energy incoherence as power is extracted from the electrons.

Accordingly, it is an object of the present invention to provide an FEL with relatively stable electron orbits in an annular beam even with large extraction efficiencies.

It is another object of the present invention to provide an FEL where the rf axial electric field interacts with the electron beam Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, the apparatus of this invention may comprise a free electron laser. A waveguide defines an axial centerline and has a wall that is symmetric about the centerline and that has an average radius component and a ripple radius component to define a variable radius with a ripple period along the axial centerline. An electron beam source outputs an electron beam into the waveguide that is parallel with and radially displaced from the axial centerline. A rf source outputs a propagating electric field that coprogagates at a selected wavelength with the electron beam within the waveguide, wherein the rf source defines a null position with the variable radius of the waveguide to interact axially with the electron beam so that the electron beam gives up power to and amplifies microwave power from the rf source.

In a particular embodiment, the average radius of the waveguide is selected to define a mode cutoff frequency for said copropagating electric field effective to cause a net transverse force on electrons forming the electron beam that averages to zero along the waveguide. In a preferred embodiment, the propagating electric field is in a TM mode. The variable radius of the waveguide is only a few percent of the average radius and the ripple period of the variable radius is greater than the selected wavelength of the propagating electric field.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings:

FIG. 3 is a pictorial illustration of various electron and beam pipe relationships discussed in the description of the invention.

FIGS. 4A and 4B are graphical representations of beam characteristics along the beam pipe.

DETAILED DESCRIPTION OF THE INVENTION

Figure 1:
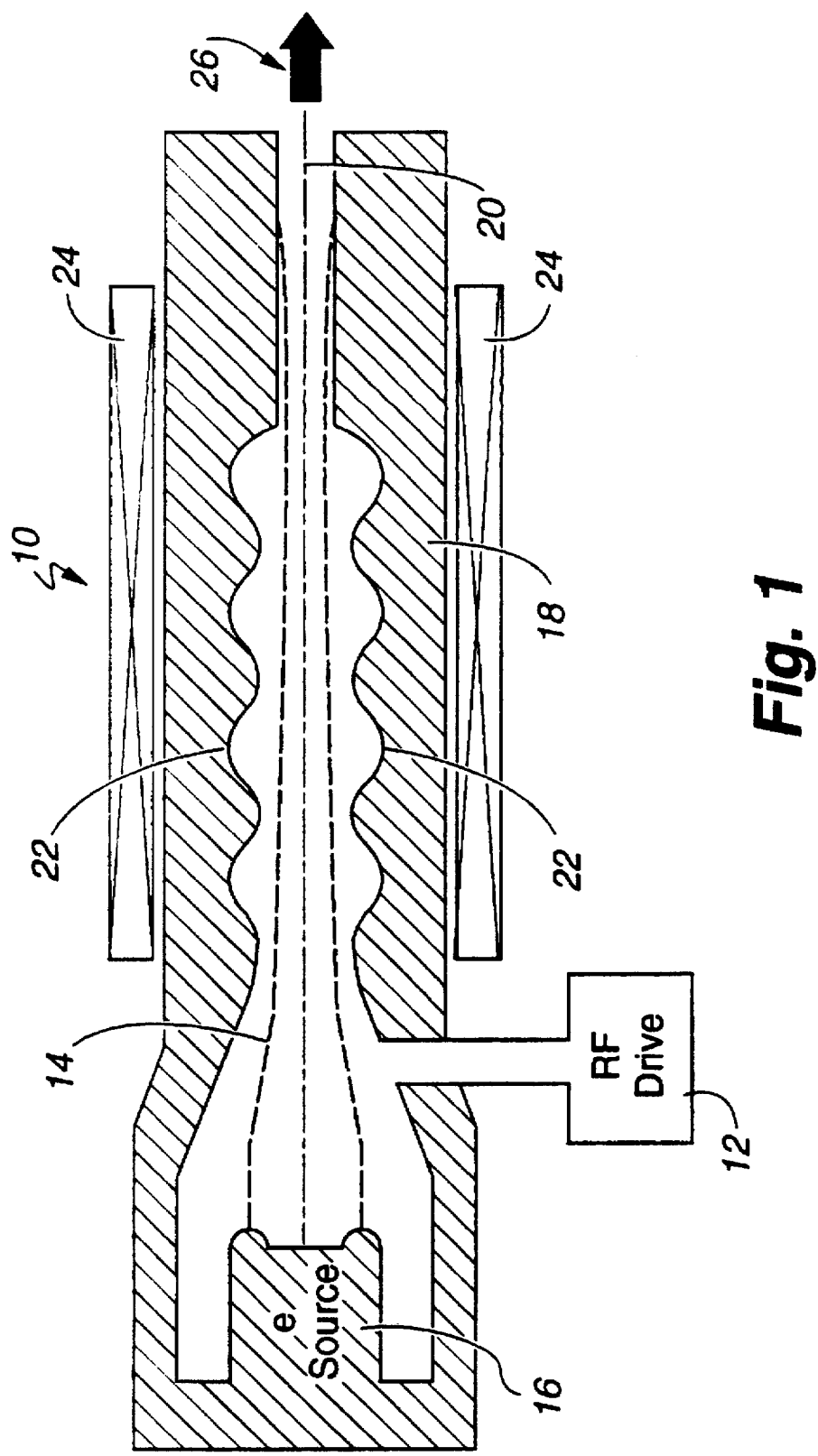
FIG. 1 is a cross-sectional schematic of a free electron laser (FEL) according to the present invention.

Although helical orbit stability for an off-axis electron beam is straightforward if an axisymmetric rf TM (transverse magnetic field) mode is used in a smooth waveguide, the dynamics of the orbit lead to no net interaction between the beam power and the mode power for transverse-coupling FELs using helical wigglers. Additionally, use of an azimuthal TM mode leads to poor coupling between the electrons and the rf field. But, in accordance with the present invention, FIG. 1 shows FEL 10 that enables coupling between an rf electric field introduced by rf drive 12 along axis 20 and an off-axis electron beam 14 that is generated by an electron beam source 16. By an off-axis electron beam is meant an electron beam that does not travel on the axis of a waveguide, e.g., a pencil beam that is radially displaced from the axis or an annular electron beam.

Waveguide 18 is provided with rippled wall 22, i.e., a smoothly varying wall radius, with a resulting ripple in the radial position of a null in the axial field, i.e., a radial wiggle in the axial electric field, as more particularly discussed with reference to FIG. 3. The average radius of wall 22 may taper along axis 20, as discussed below. The electron beam velocity is less than the phase velocity of the electric field so that the electric field "slips" by along the electron beam 14. Electron beam 14 then sees a change in the axial electric field at the beam location from the radial wiggling of the axial electric field. Solenoid magnet 24 produces an axial magnetic guide field to constrain the electrons in electron beam 14 to move axially at a constant radius. The radial wiggling of the axial electric field, along with the phase slippage, provides a net interaction between the axial electric field of the rf mode and the axial velocity of off-axis electron beam 14. The rf mode in the waveguide is amplified by this interaction. After the interaction, the axial magnetic field decreases and the electron beam is intercepted by the wall of waveguide 18. Amplified rf 26 propagates out the end of waveguide 18 to a desired application.

The net interaction strength is comparable to interactions with helical wigglers for ripple amplitudes on the order of a few percent i.e., about 1–3% of the waveguide radius. This interaction is relatively insensitive to errors in the actual electron beam radius, and these ripples do not lead to excessive mode reflections or otherwise effect the overall mode propagation. The net transverse force (see Eqn. (1)) is made to average to zero for $TM_{Om}$ modes by the proper choice of the mode cutoff frequency. It will be appreciated that the transverse force cannot be made to vanish for a FEL operating with a TE mode rf. Thus, if the electron orbits are originally in the axial direction, the orbits remain so as the beam traverses the device while losing energy to the rf mode.

In order to illustrate the vanishing of the transverse force of interest herein, assume first that the electron beam is on-axis, i.e., not annular, and that the wiggle motion is small. For a $TM_{nm}$ mode in a cylindrical waveguide, the electric and magnetic fields very close to the axis lead to a net force from the rf field with radial and azimuthal components $E_r$ and $E_\theta$ given by $$\vec{F}_{rf} = e \left( E_r(1 - \beta_z/\beta_c), E_\theta(1 - \beta_z/\beta_c), E_z + \frac{\beta_r E_r + \beta_\theta E_\theta}{\beta_c} \right), \quad \text{Eqn. (3)}$$

where $\beta_{z,r,\theta}$ is the electron velocity in the indicated direction normalized to the speed of light; $\beta_c$ is defined to be $(1 - \omega_c^2/\omega^2)^{1/2}$, where $\omega$ is the mode radian frequency and $\omega_c$ is the mode cutoff radian frequency. Only an axial force remains if the mode cutoff frequency $\omega_c$ is chosen such that $\beta_z = \beta_c$. This relationship can be readily satisfied by the proper selection of waveguide average radius, which determines the mode cutoff frequency.

Figure 2:
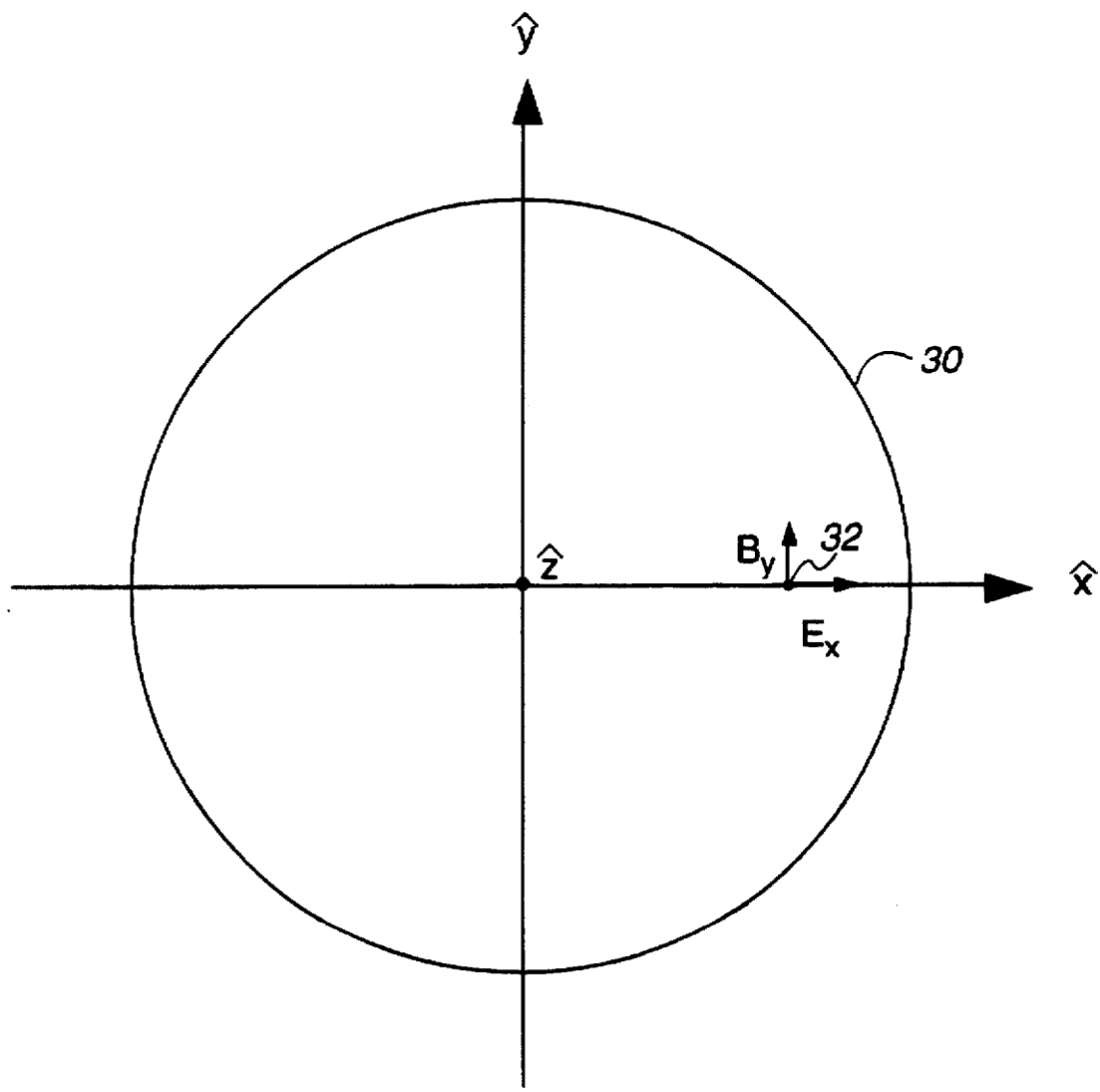
FIG. 2 is a cross-section of a beam pipe showing nomenclature used in the description of the invention.

Define the $\hat{z}$ axis of cylindrical beam pipe 30 so that an electron 32 travels parallel to that axis, as shown in FIG. 2. The work done by the net force from the rf field components ($E_x$, $E_z$) and $B_y$ on electron 32 is given by $$W = \int e \vec{E} \cdot \vec{v} \, dt \quad \text{Eqn. (4)}$$

In Eqn. (3), $E_z$ has a non-zero time averaged value from the combination of the rf phase slippage and the radial wiggling of the rf field mode.

An electron traverses an orbit, i.e., moves in a path about the axial magnetic field, as the electron moves parallel along the axis. An orbit is stable if the radius of the path is not increasing during axial electron movement. An unstable orbit that is increasing in radius can result in electron 32 impacting the beam pipe 30 wall and concomitant loss of the electron beam. Ignoring space-charge and the rf forces, it can be shown that the same stability of the orbits obtained with the present invention are obtained as with the absence of rf fields if the mode cutoff frequency satisfies $\beta_z = \beta_c$.

The key element of the FEL interaction is that the rf slippage provides resonant coupling between the rf and some dynamic feature of the beam. With a helical wiggler the synchronous coupling is between the transverse motion of a particle and a transverse electric field. FIG. 3 shows a periodic rippled circular waveguide 34, in accordance with the present invention. Beam 36 is shown as off-axis within this waveguide. The average waveguide radius is a. The actual waveguide 34 radius varies, preferably sinusoidally, between $a(1+\epsilon)$ and $a(1-\epsilon)$ with each section having a periodic length $\lambda_w$. Assume a $TM_{Om}$ mode rf field and off-axis annular electron beam 36 with annulus radius R are copropagating in parallel with axis 40 in this waveguide. For simplicity, assume that beam 36 radius R is placed at a null of the axial electric field when the mode is in a waveguide of radius a.

The periodicity $\lambda_w$ of waveguide 34 is significantly greater than the rf wavelength of the copropagating electric field, so the mode smoothly adjusts to the varying dimensions of waveguide 34. The axial electric field at the position of beam 36, to first order in $k_c \epsilon R$, where $k_c$ is the cut-off wave number for the TM mode, is represented by $$E_z = A k_c \epsilon R J_1(k_c R) \cos(k_w z) \quad \text{Eqn. (5)}$$

where $k_w = 2\pi/\lambda_w$, and an exponential behavior is assumed for the phase of the rf mode. Note that $k_c a$ is larger than unity; for example $k_c a$ equals 8.65 for a $TM_{03}$ mode and 11.79 for a $TM_{04}$ mode. Thus, if the radius perturbation $\epsilon a$ is only a percent of the waveguide radius a, the magnitude of the axial field is about 1/10 the magnitude of the mode's radial field.

Now consider the case where the periodicity $\lambda_w$ of waveguide 34 is chosen so an rf wavelength slips by an electron as an electron 36 traverses one waveguide period. A synchronism analogous to the transverse FEL has been obtained. Assume the axial electric field is directed backwards when electron 36 is an axial position corresponding to a maximum waveguide radius, i.e., $a(1+\epsilon)$. At this location, the electron is at a radial position less than that of the null of the axial field. Now, when electron 36 has traveled a half waveguide period, a half rf wavelength has slipped by the electron, reversing the sign of all the rf fields at the relative axial location of the electron. Electron 36 is now at a location corresponding to a minimum waveguide radius and is at a larger radial position than the null, leading to another sign change of the axial electric field at the position of electron 36. In a transverse-coupling FEL the particles are wiggled to provide the synchronism; in accordance with the present invention the rf field is wiggled, shown by the wiggled null field location 38, by mechanically contracting and expanding the radius of waveguide 34 to provide synchronism. The same synchronism equation as for the transverse free-electron laser applies in the present invention:

$$\frac{\omega}{c\beta_z} = \frac{\omega}{v_p} - k_w \qquad \text{Eqn. (6)}$$

where $v_p$ is the phase velocity $c/\sqrt{1-\omega_c^2/\omega^2}$ and the other terms are defined above. In analogy to the transverse-coupling FEL, the term "axial FEL" is used to denote this interaction mechanism.

Note that the axial FEL interaction mechanism only exists for a TM mode since TE modes have no axial electric fields. The interaction strength depends on $v_z E_z$ as opposed to $v_\perp E_\perp$ (i.e., transverse interactions) for helical electron wiggles. Since $v_z$ is typically much larger than $v_\perp$ (often by an order of magnitude) the interaction strengths for an axial FEL and for a transverse FEL are similar even with a ripple amplitude of only a few percent, leading to a similar gain and a comparable number of wiggle periods for a practical device.

This interaction is related to one suggested by Nation for particle acceleration in which a straight pencil beam interacts with a $TM_{0n}$ mode in a circular waveguide that is undulating back and forth (the radius of the waveguide remains constant), as described by L. N. Hand, "Summary of the Working Group on Novel and Exotic Ideas," AIP Conference Proceedings 156, pp. 395–410, at pg. 406. In that device, called a "longitudinal FEL," a very large undulation amplitude was needed because the interaction canceled to first order. The stronger interaction strength of the axial FEL according to the present invention is established by using an off-axis beam. In addition, the axial FEL herein uses a variation in the waveguide radius to establish the synchronism instead of periodic transverse displacements of the waveguide.

This is a fundamentally different interaction from a slow-wave interaction, such as occurs in a traveling wave tube, because of the long waveguide ripple period. A slow-wave interaction occurs between an electron beam and a rf mode with a phase velocity below the speed of light. In a slow-wave structure the waveguide ripple period is comparable to the rf wavelength. In the present invention, the rf wavelength is much shorter than the waveguide ripple period $\lambda_w$, and the rf mode phase velocity is greater than the speed of light.

The interaction is stable; i.e. the interaction strength is a weak function of small changes in the beam radius. Assume that the mode strength A is a slowly varying function of z and can be considered constant over any wiggle period. For the general case, where the beam radius does not necessarily correspond to a zero of the $J_o$ Bessel function, the axial electric field can be expanded as $$E_z = A J_0(k_c R) + A k_c \epsilon R J_1(k_c R) \cos(k_w z). \qquad \text{Eqn. (7)}$$

The work done on a particle integrated over a waveguide period is $$\int_0^{\lambda_w} e E_z dl = \lambda_w e A k_c \epsilon R J_1(k_c R) \cos\phi \qquad \text{Eqn. (8)}$$

where $\phi$ denotes the phase of the particle relative to the rf ($\phi=0$ is for maximum power loss from the electron to the rf). There is no net interaction if R vanishes. Thus an annular electron beam or an off-axis solid beam must be used in an axial FEL. In order to make the work relatively insensitive to small shifts in the annulus radius, R is picked such that $RJ_1(k_c R)$ is relatively insensitive to small changes in R. Two advantageous features occur: (1) the work is insensitive to small shifts in R and (2) this ensures that $J_1(k_c R)$ is large and there is a large amount of power transfer from the beam to the rf mode. When the average waveguide radius is selected to satisfy the cutoff frequency relationship, $\beta_z = \sqrt{1-\omega_c^2/\omega^2}$, the transverse force clearly averages to zero over a waveguide period. Thus, picking the average waveguide radius to satisfy the cutoff frequency relationship will eliminate any net transverse force on the particles. Note that as power is extracted from the particle its axial velocity will decrease. In order to maintain the cancellation of the transverse force the average waveguide radius should taper inward along the device. In this case the electron beam radius should be reduced by adjusting the external guide magnetic field to keep $RJ_1(k_c R)$ large.

Figure 4B:
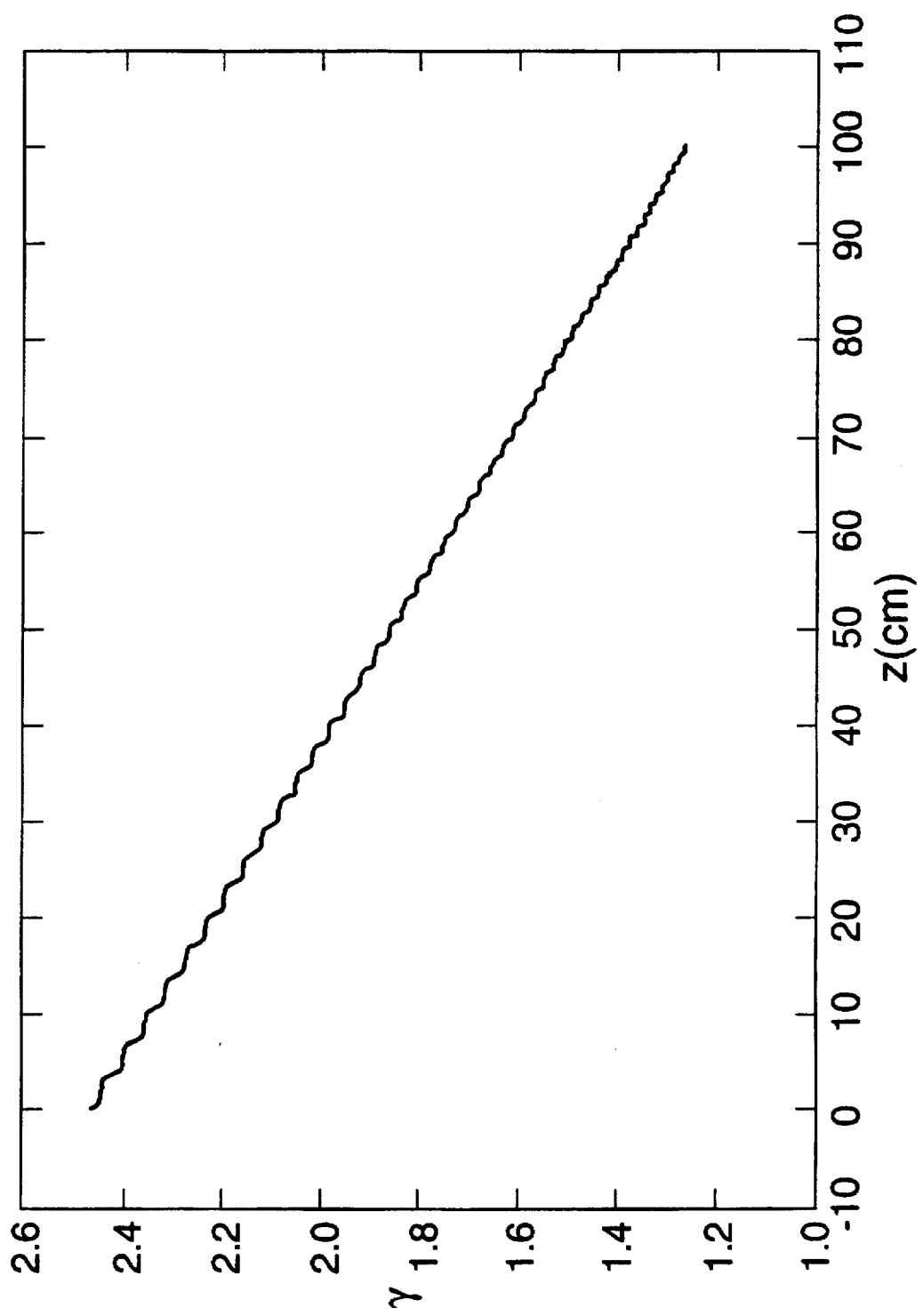

FIGS. 4A and 4B show the transverse orbit and particle energy for an axial FEL with a tapered wiggle period but with a uniform waveguide average radius for simplicity. As power is extracted from the electron, its velocity decreases, and the wiggle period must also be decreased (tapered) to maintain synchronism (see, e.g., Eqn. (6)). The initial wiggle period is 3.64 cm ($k_w=172.5$ m$^{-1}$), the initial beam energy is 750 keV, and the initial axial velocity $\beta_z=0.9142$. The synchronism condition, Eqn. (6), gives a synchronous frequency of 45.82 GHz. For the following cases a smooth sinusoidal ripple was used with a 5% amplitude variation in the waveguide radius. The average waveguide radius is 2.22 cm, satisfying the cutoff frequency relationship for the initial beam axial velocity. The electron beam radius was selected to be around the second null of $E_z(J_0(k_c R)=0, R=1.3$ cm).

In FIG. 4A, the orbit is plotted for a particle copropagating with a 75 MW $TM_{03}$ mode (which has a maximum transverse electric field gradient of 13 MV/m) for one meter. This particle has been phased for maximum energy loss.

FIG. 4B shows the energy loss of this particle as a function of axial position. More than 80% of the electron's initial energy is extracted by the axial FEL mechanism. This orbit remains small (<100 μm, shown in FIG. 4A) even though the average waveguide radius is not tapered and the cutoff frequency relationship is violated as energy is extracted from the particle.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A free electron laser comprising:
    a waveguide defining an axial centerline and having a wall that is symmetric about said centerline and that has an average radius component and a ripple radius component having a variable radius with a ripple period along said axial centerline;

an electron beam source for outputting an electron beam into said waveguide that is parallel with and radially displaced from said axial centerline; and a rf source for outputting a propagating electric field that coprogagates at a selected wavelength with said electron beam within said waveguide, wherein said rf source defines a null position with said variable radius of said waveguide to interact axially with said electron beam so that said electron beam gives up power to and amplifies microwave power from said rf source.

2. A free electron laser according to claim 1, wherein said average radius of said waveguide is selected to define a mode cutoff frequency for said copropagating rf electric field effective to cause a net transverse force on electrons forming said electron beam that averages to zero along said waveguide.

3. A free electron laser according to claim 2, wherein said propagating electric field is in a TM mode.

4. A free electron laser according to claim 3, wherein said average radius decreases along said axial centerline to maintain a zero value of said net transverse force as energy is transferred from said electron beam to said copropagating electric field.

5. A free electron laser according to claim 2, wherein said variable radius of said waveguide is a few percent of said average radius.

6. A free electron laser according to claim 5, wherein said average radius decreases along said axial centerline to maintain a zero value of said net transverse force as energy is transferred from said electron beam to said copropagating electric field.

7. A free electron laser according to claim 2, wherein said ripple period is greater than said selected wavelength of said propagating electric field.

8. A free electron laser according to claim 2, wherein said average radius decreases along said axial centerline to maintain a zero value of said net transverse force as energy is transferred from said electron beam to said copropagating electric field.

9. A free electron laser according to claim 2, wherein said electron beam is an annular electron beam centered about said axial centerline.

10. A free electron laser according to claim 1, wherein said propagating electric field is in a TM mode.

11. A free electron laser according to claim 10, wherein said variable radius of said waveguide is a few percent of said average radius.

12. A free electron laser according to claim 10, wherein said ripple period is greater than said selected wavelength of said propagating electric field.

13. A free electron laser according to claim 10, wherein said electron beam is an annular electron beam centered about said axial centerline.

14. A free electron laser according to claim 1, wherein said variable radius of said waveguide is a few percent of said average radius.

15. A free electron laser according to claim 14, wherein said ripple period is greater than said selected wavelength of said propagating electric field.

16. A free electron laser according to claim 14, wherein said electron beam is an annular electron beam centered about said axial centerline.

17. A free electron laser according to claim 1, wherein said ripple period is greater than said selected wavelength of said propagating electric field.

18. A free electron laser according to claim 17, wherein said electron beam is an annular electron beam centered about said axial centerline.

19. A free electron laser according to claim 1, wherein said electron beam is an annular electron beam centered about said axial centerline.

20. In a free-electron laser, a waveguide effective to generate an axial interaction between an off-axis electron beam and an axial electric field copropagating within said waveguide, said waveguide defining an axial centerline and having a wall that is symmetric about said centerline and that has an average radius and a ripple radius, said ripple radius being variable about said average radius and having a ripple period along said axial centerline.

21. A waveguide according to claim 20, wherein said average radius of said waveguide is selected to define a mode cutoff frequency effective to cause a net transverse force on electrons forming said electron beam that averages to zero along said waveguide.

22. A free electron laser according to claim 21, wherein said average radius decreases along said axial centerline to maintain a zero value of said net transverse force as energy is transferred from said electron beam to said copropagating electric field.

23. A waveguide according to claim 20, wherein said variable radius of said waveguide is a few percent of said average radius.

24. A waveguide according to claim 20, wherein said ripple period is greater than said selected wavelength of said propagating electric field.

25. A waveguide according to claim 20, wherein said average radius decreases along said axial centerline to maintain a zero value of said net transverse force as energy is transferred from said electron beam to said copropagating electric field.

* * * * *